United States Patent [19]
Fukuda et al.

[11] Patent Number: 5,287,198
[45] Date of Patent: Feb. 15, 1994

[54] IMAGE READING APPARATUS

[75] Inventors: Haruhiko Fukuda, Kawasaki; Kohtaroh Yonenaga, Yokohama, both of Japan

[73] Assignee: Ricoh Company, Ltd., Tokyo, Japan

[21] Appl. No.: 719,500

[22] Filed: Jun. 24, 1991

[30] Foreign Application Priority Data
Jun. 25, 1990 [JP] Japan .................................. 2-164057
Mar. 26, 1991 [JP] Japan .................................. 3-084333

[51] Int. Cl.[5] .............................................. H04N 1/00
[52] U.S. Cl. .................................... 358/401; 358/483; 358/471; 358/474; 348/341
[58] Field of Search ................ 358/75, 400, 401, 406, 358/482, 483, 474, 213.11, 213.15, 213.18, 213.19, 213.24, 213.27, 222, 471

[56] References Cited
U.S. PATENT DOCUMENTS
4,634,885 1/1987 Inoue et al. ......................... 358/483
4,654,723 3/1987 Nagano ............................... 358/483
5,140,445 8/1992 Takashima et al. ................. 358/483

*Primary Examiner*—Edward L. Coles, Sr.
*Assistant Examiner*—Fan Lee
*Attorney, Agent, or Firm*—Oblon, Spivak, McClelland, Maier & Neustadt

[57] ABSTRACT

An image reading apparatus applicable to, for example, an electronic copier or a facsimile transceiver for reading an image by use of CCDs or similar reading elements. A circuit included in the apparatus and not having a time constant is driven at the same time as the start of an image reading operation, while a circuit having a time constant is driven earlier by taking account of the time constant. The apparatus, therefore, reduces electromagnetic interference and saves power while eliminating defective image signals.

4 Claims, 5 Drawing Sheets

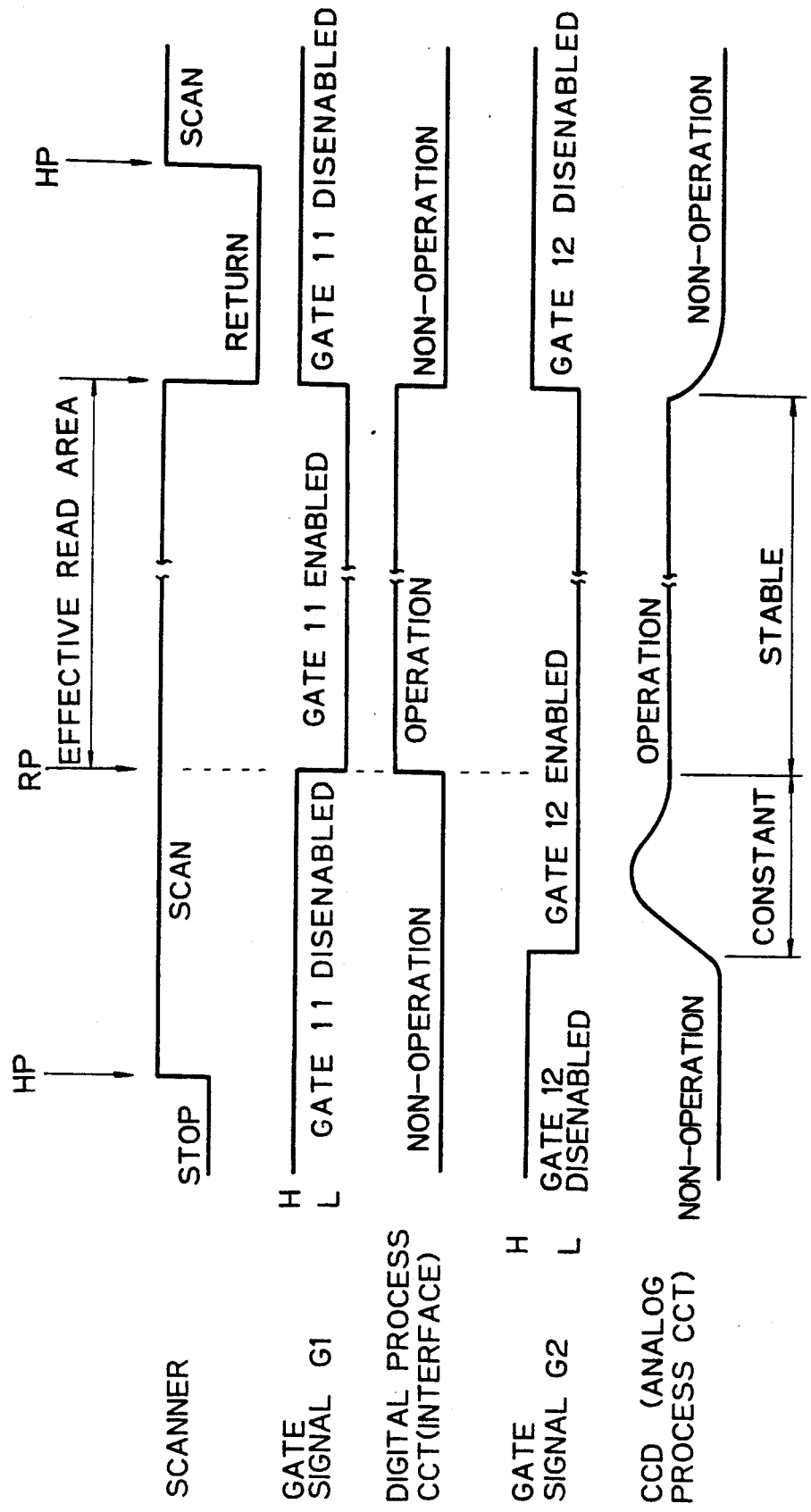

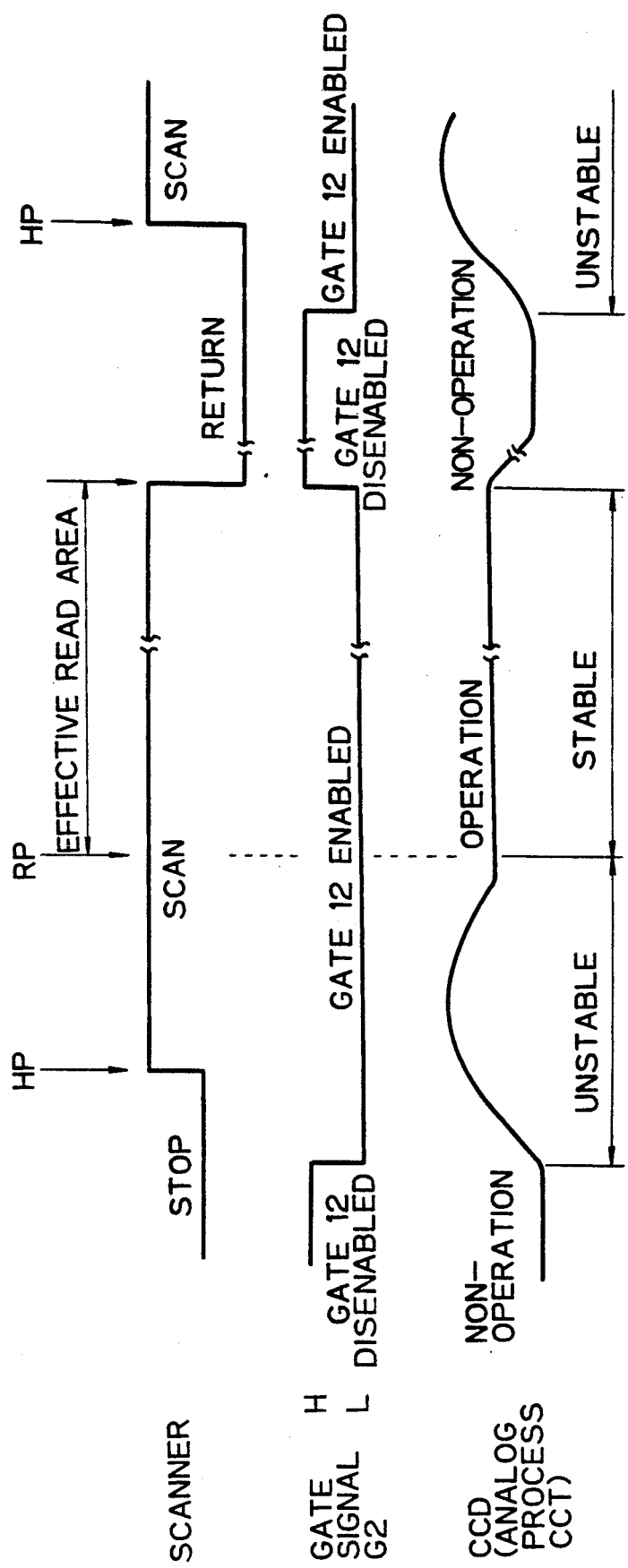

IMAGE READING APPARATUS

BACKGROUND OF THE INVENTION

The present invention relates to an image reading apparatus of the type using CCDs (Charge Coupled Devices) or similar reading elements and, more particularly, to an image reading apparatus desirably applicable to an electronic copier, facsimile transceiver or similar image recording apparatus.

Generally, an image reading apparatus reads an image carried on, for example, an original document by CCDs or similar reading elements via optics while moving the document and the reading elements relative to each other. The reading elements photoelectrically convert the image to produce an image signal. The image signal is written to a storage as image data, displayed on a display, and/or transferred to a printer to be printed out on a recording medium. A controller has a CPU (Central Processing Unit) and a clock generating circuit or a timing generating circuit which generates a clock signal for clocking the reading elements. The problem with a conventional image reading apparatus is that once the power source of the apparatus is turned on, all the circuits including the CCDs are rendered operative, i.e., they are constantly driven even when actual image reading operations are not needed. The CCDs therefore remain in a stand-by state over a longer period of time than in an image reading state, not only aggravating power consumption but also accelerating temperature elevation inside the apparatus.

An image reading apparatus elaborated to eliminate the above problem is disclosed in Japanese Patent Application No. 213082/1989. Specifically, the apparatus disclosed in this Patent Application has a timing generating circuit for feeding clock signals such as a transfer clock and a shift clock to CCDs or similar image reading elements, a gate for selectively interrupting the delivery of the clock signals from the timing generating circuit to the CCDs, and a controller for enabling the gate in the event of image reading. This kind of implementation, however, brings about another problem since some components of a processing circuit included in the apparatus have particular time constants. Specifically, if a timing signal is fed to such a processing circuit simultaneously with the start of an image reading operation, the processing circuit has to process an image signal before it fully starts up, rendering the image signal defective. For example, it takes about several hundred milliseconds for CCDs to fully start up. Hence, should CCDs be driven simultaneously with the start of image reading, several hundred lines of data would be outputted in an unstable condition. On the other hand, regarding circuit components without any time constant, it is preferable to delay the generation of a timing signal from the electromagnetic interference and power consumption standpoint.

SUMMARY OF THE INVENTION

It is therefore an object of the present invention to provide an image reading apparatus which eliminates electromagnetic interference and saves power without disturbing an image signal.

It is another object of the present invention to provide a generally improved image reading apparatus.

An apparatus for reading an image of the present invention comprises a first image processing circuit having a time constant, a second image processing circuit having no time constant, and a timing signal generating circuit for feeding a timing signal to each of the first and second image processing circuits. The second image processing circuit is driven only at the time of image reading, while the first image processing circuit is driven earlier by taking account of the time constant or is constantly driven.

BRIEF DESCRIPTION OF THE DRAWINGS

The above and other objects, features and advantages of the present invention will become more apparent from the following detailed description taken with the accompanying drawings in which:

FIGS. 4 and 5 are timing charts demonstrating specific operation of the embodiment.

DESCRIPTION OF THE PREFERRED EMBODIMENT

Figure 1:
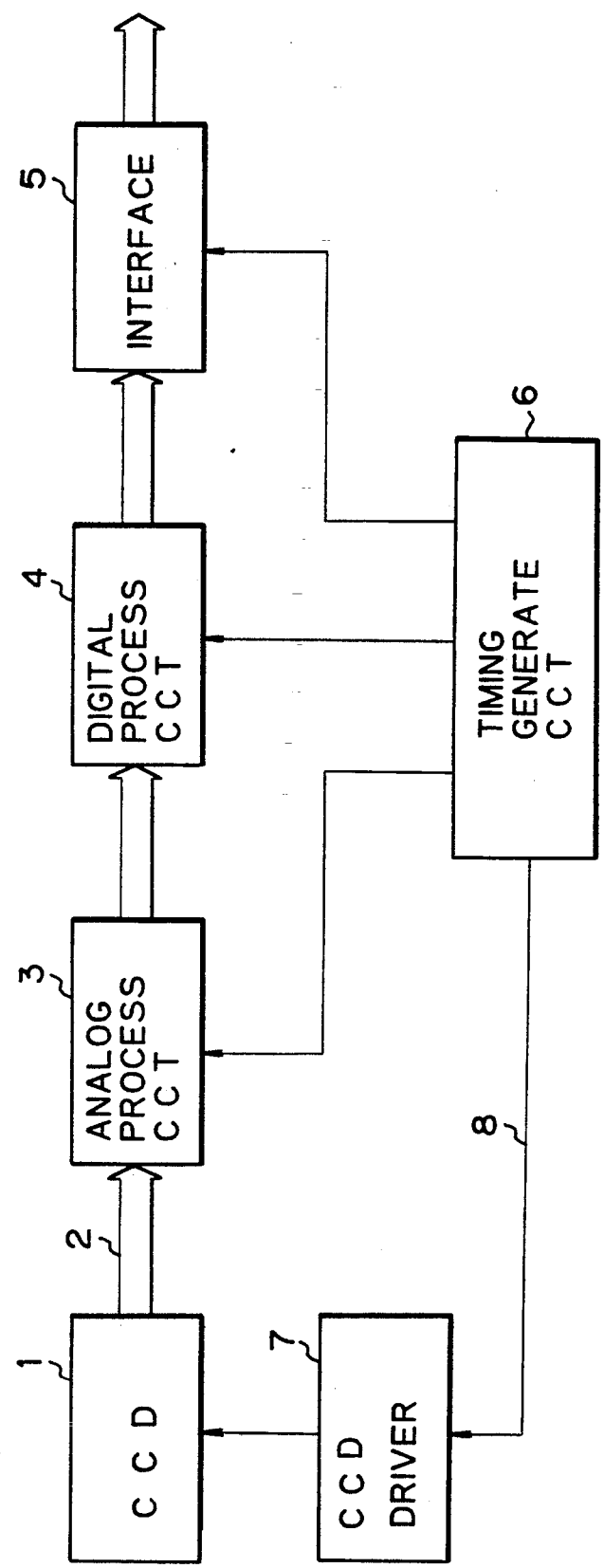
FIG. 1 is a block diagram schematically showing an image processing circuit included in an image reading apparatus embodying the present invention.

Referring to FIG. 1 of the drawings, image processing circuitry included in an image reading apparatus embodying the present invention is shown. As shown, the circuitry has CCDs 1 for reading an image to produce corresponding image data 2. An analog processing circuit 3 processes the image data in an analog fashion. A digital processing circuit 4 digitally processes the output of the analog processing circuit 3. An interface 5 interfaces the digital processing circuit 4 to another circuit as a circuit included in an image writing apparatus, not shown. A timing generating circuit 6 delivers a timing signal 8 to such the above-mentioned circuits and to a CCD driver 7. In the drive control aspect, the image reading apparatus has a group of circuits having time constants, e.g., CCDs 1 and analog processing circuit 3 and a group of circuits having no time constant, e.g., the digital processing circuit 4 and interface 5. The output of the timing signal from the timing generating circuit 6 is controlled in a particular manner with each of the circuits with time constants and the circuits without a time constant.

Figure 2:
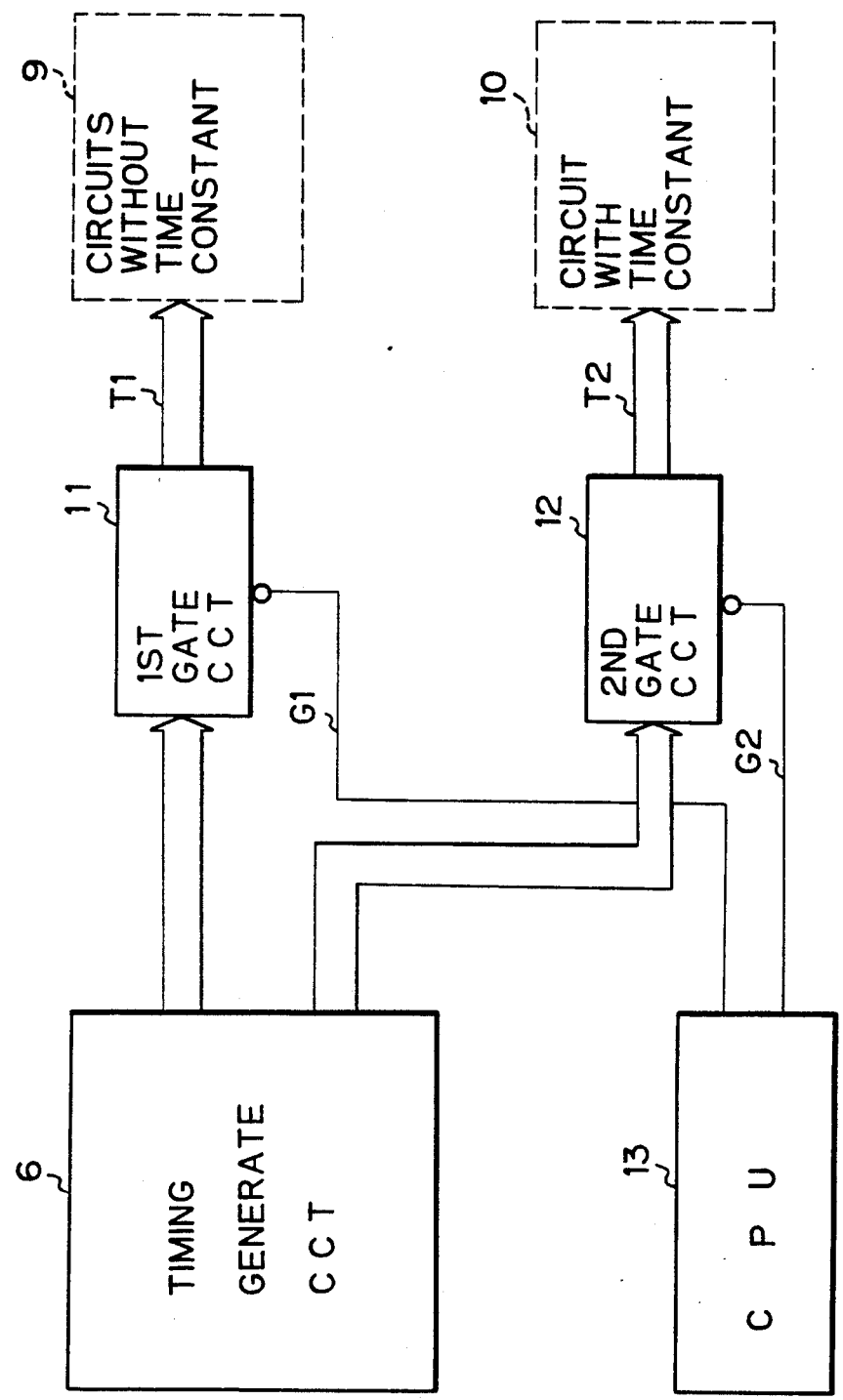
FIG. 2 is a schematic block diagram showing how the embodiment feeds a timing signal to a circuit with a time constant and a circuit without a time constant.

Specifically, as shown in FIG. 2, a first gate 11 is connected between the timing generating circuit 6 and a circuit without a time constant 9 (e.g. digital processing circuit 4 or interface 5). A second gate 12 is interposed between the timing generating circuit 6 and a circuit with a time constant 10 (e.g. CCDs 1 or analog processing circuit 3). The CPU 13 feeds gate signals G1 and G2 to the first and second gates 11 and 12, respectively. Specifically, the CPU 13 delivers the gate signal G1 to the circuit without a time constant 9 simultaneously with the start of an image reading operation, causing the first gate 11 to output a timing signal T1. On the other hand, the CPU 13 feeds the gate signal G2 to the circuit with a time constant 10 to drive it earlier by taking account of the time constant or to drive it continuously, causing the second gate 12 to output a timing signal T2.

Figure 3:
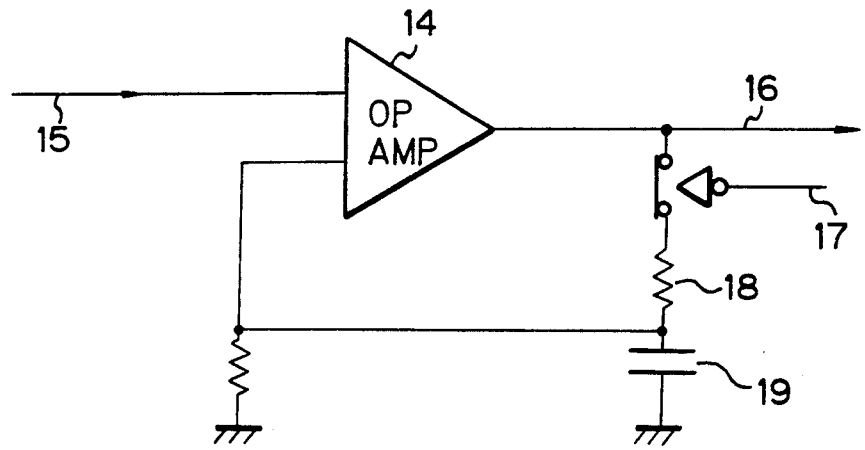
FIG. 3 is a diagram representative of a specific circuit having a time constant.

FIG. 3 shows a black correction circuit representative of a circuit with a time constant. In the figure, there are shown an operational amplifier (OP AMP) 14, an image signal 15 not having undergone correction, an image signal 16 having undergone correction, a drive timing signal 17, a resistor 18, an a capacitor 19.

FIGS. 4 and 5 are timing charts demonstrating specific operations of the illustrative embodiment. As shown, a scanner carrying a lamp, optics and CCDs therewith or, when the CCDs and lens are fixed in place below the scanner, carrying only the lamps and optics therewith starts moving from a home position HP thereof to a read start position RP, starting reading an effective reading area. The effective reading area is defined by a document and a white reference plate which precedes the document. Only fully scanning the effective reading area, the scanner returns to the home position HP and stops there. When the scanner reaches the read start position RP, the gate signal G1 goes low enabling the gate 11. At the same time, the digital processing circuit 4 (interface 5) starts operating. Since the digital processing circuit 4 does not have a time constant, the image data processed thereby are immediately valid. The gate signal G2 goes low a predetermined period of time (e.g. 200 milliseconds) earlier than the time when the scanner reaches the read start position RP, taking account of the time constants of the CCDs 1 and analog processing circuit 3. At the same time, the gate 12 is enabled, and the CCDs 1 or analog processing circuit 3 starts operating. The operation of the CCDs 1 having a time constant is stabilized when the scanner reaches the read start position RP at latest. As soon as the scanner starts returning toward the home position HP after scanning the effective reading area, both of the gate signals G1 and G2 go high to disenable the associated gates 11 and 12. As a result, the circuits constituting the image processing circuitry stop operating.

Assume that the time constant of the CCDs 1 is greater than the period of time necessary for the scanner to move from the home position HP to the read start position RP. Then, the gate signal G2 has to go low before the start of movement of the scanner since causing the former to go low after latter would be to late, as will be described with reference to FIG. 5.

In a repetitive scan mode, no problem arises if the time constant of the CCDs 1 is small, as shown in FIG. 4. As shown in FIG. 5, when the time constant of the CCDs 1 is great, it is only necessary for the gate signal G2 to go low for the next scanning while the scanner is in a returning movement. Alternatively, an arrangement may be made such that the scanner having returned to the home position HP is held in a halt for a predetermined period of time without starting on another scanning movement, allowing the gate signal G2 to go low while the scanner is in a returning movement or in a halt. In FIG. 5, the gate signal G2 is shown as being switched in logical level while the scanner is returning.

Assume that stopping the scanner in a repetitive scan mode is not desired, and that switching the logical level of the gate signal G2 while the scanner is in a returning movement renders the operation of the CCDs 1 unstable. Then, the gate signal G2 may be constantly held in a low level white the repetitive scan mode operation is under way and then set at a high level on the completion of the last scanning movement, i.e., at the beginning of the last returning movement.

In summary, it will be seen that the present invention provides an image reading apparatus which reduces electromagnetic interference and saves power while eliminating defective image signals. These unprecedented advantages are derived from the fact that a circuit without a time constant is driven at the same time as the start of an image reading operation while a circuit with a time constant is driven earlier by taking account of the time constant.

Various modifications will become possible for those skilled in the art after receiving the teachings of the present disclosure without departing from the scope thereof.

What is claimed is:

1. An apparatus for reading an image, comprising:
   first image processing means including image reading elements having a time constant;
   second image processing means having no time constant;
   timing signal generating means for feeding a timing signal to each of said first and second image processing means; and
   a scanner loaded with at least said image reading elements;
   said second image processing means being driven only at the time of image reading, said first image processing means being driven earlier by taking account of the time constant, and
   wherein said scanner is held in a halt for a predetermined period of time while in a returning movement after scanning and before starting on a next reading operation, said first image processing means starts to be driven for said next reading operation while said scanner is in said halt.

2. An apparatus as claimed in claim 1, wherein the feed of said timing signal to said first image processing means and the feed of said timing signal to said second image processing means are controlled independently of each other.

3. An apparatus as claimed in claim 2, wherein said first image processing means further comprises an analog processing circuit for processing an image signal produced by said image reading elements, and said second image processing means comprises at least one of a digital processing circuit for digitally processing an output signal of said analog processing circuit and an interface for interfacing said digital processing circuit to an external circuit.

4. An apparatus as claimed in claim 1, wherein in a repetitive scan mode said first image processing means is driven earlier by taking account of the time constant thereof at the first reading operation and is constantly driven while said repetitive scan mode is under way.

* * * * *